US012596185B2

(12) United States Patent
Klovning

(10) Patent No.: US 12,596,185 B2
(45) Date of Patent: Apr. 7, 2026

(54) ROBUST VIRTUAL SENSOR

(71) Applicant: Elliptic Laboratories ASA, Oslo (NO)

(72) Inventor: Espen Klovning, Strømmen (NO)

(73) Assignee: Elliptic Laboratories ASA, Oslo (NO)

( * ) Notice: Subject to any disclaimer, the term of this patent is extended or adjusted under 35 U.S.C. 154(b) by 134 days.

(21) Appl. No.: 18/721,475

(22) PCT Filed: Dec. 19, 2022

(86) PCT No.: PCT/EP2022/086622
§ 371 (c)(1),
(2) Date: Jun. 18, 2024

(87) PCT Pub. No.: WO2023/126230
PCT Pub. Date: Jul. 6, 2023

(65) Prior Publication Data
US 2025/0067860 A1 Feb. 27, 2025

(30) Foreign Application Priority Data
Jan. 3, 2022 (NO) .................................... 20220004

(51) Int. Cl.
*G01S 7/52* (2006.01)
*G01S 15/04* (2006.01)
(Continued)

(52) U.S. Cl.
CPC .......... *G01S 7/52004* (2013.01); *G01S 15/04* (2013.01); *G01S 15/86* (2020.01); *G01S 15/88* (2013.01)

(58) Field of Classification Search
CPC ...... G01S 7/52004; G01S 15/04; G01S 15/86; G01S 15/88; G01S 17/04; G01D 3/08; G01D 21/02; G06N 3/08; G06N 20/00
See application file for complete search history.

(56) References Cited

U.S. PATENT DOCUMENTS

2010/0090899 A1* 4/2010 Zhao .................. G01S 5/02527
342/463
2018/0306609 A1 10/2018 Agarwal et al.
(Continued)

FOREIGN PATENT DOCUMENTS

CA 2886106 A1 * 7/2014 .......... A47L 11/4011
CN 118613698 A * 9/2024 ............. G01S 15/88
(Continued)

OTHER PUBLICATIONS

Safavi, Saeid et al., "Multi-Sensor Fault Detection, Identification, Isolation and Health Forecasting for Autonomous Vehicles," Sensors 2021, vol. 21, Issue 2547, https://doi.org/10.3390/s21072547, pp. 1-23.
(Continued)

*Primary Examiner* — Daniel Pihulic
(74) *Attorney, Agent, or Firm* — Bradley Arant Boult Cummings LLP

(57) ABSTRACT
The present invention relates to an electronic device and corresponding method, where the electronic device includes at least two sensors. The at least two sensors are in communication with a virtual sensor including a processing unit adapted to monitor the use of the device based on input from said sensors. The at least two sensors include activity sensors sensing user activities related to the device, and the processing unit is configured to receive and analyze the input from said sensors during use and to provide and store a model representing said typical use of the device. The device further being configured to compare new measurements received from said sensors with said model, providing a signal if the new measurements from said sensors deviates by a predetermined limit from the measurements predicted by the model.

12 Claims, 2 Drawing Sheets

(51) Int. Cl.
    G01S 15/86       (2020.01)
    G01S 15/88       (2006.01)

(56)          References Cited

U.S. PATENT DOCUMENTS

| | | |
|---|---|---|
| 2019/0034609 A1 | 1/2019 | Yang et al. |
| 2019/0101410 A1 | 4/2019 | Kuper et al. |
| 2025/0067860 A1* | 2/2025 | Klovning ................ G01S 15/88 |

FOREIGN PATENT DOCUMENTS

| | | | | |
|---|---|---|---|---|
| DE | 102009009448 A1 | 8/2010 | | |
| DE | 102017211737 A1 | 1/2019 | | |
| EP | 3379360 A2 | 9/2018 | | |
| ES | 2871348 T3 * | 10/2021 | ............. | G06N 20/00 |
| JP | 2025504711 A * | 2/2025 | ............. | G01S 15/88 |
| KR | 20240118872 A * | 8/2024 | ............. | G01S 15/88 |
| NO | 345005 B1 | 5/2020 | | |
| NO | 345509 B1 | 3/2021 | | |
| NO | 20210589 A1 | 9/2022 | | |
| WO | WO-2020246897 A1 | 12/2020 | | |
| WO | WO-2023126230 A1 * | 7/2023 | ............. | G01S 15/88 |

OTHER PUBLICATIONS

Patent Cooperation Treaty, International Application No. PCT/EP2022/086622, "International Search Report," Mar. 17, 2023, 3 pages.

* cited by examiner

ROBUST VIRTUAL SENSOR

The present invention relates to an electronic device with at least one virtual sensor, especially an electronic device including activity sensors measuring user activity in relation to the device, such as acoustic and inertia sensors, as well as gesture recognition, presence detection, activity detection, positioning.

Electronic devices are to a greater degree being equipped with physical sensors to provide desirable features to their users. Some of the devices are also utilizing virtual sensors, that is, software sensors that combines information (e.g. sensor events, time-series data) from at least one physical sensor and creates a new sensor providing potentially new or improved sensor output based on customer requirements. In most cases, a virtual sensor uses sensor fusion techniques, for example as discussed in US2018/0306609, which combines different types of individual sensors in a "smart home" configuration, or WO2020/246897, and combines information from more than one core sensor to create a completely new sensor providing a cost-effective alternative to a specialized hardware sensor in an electric device combining the use of acoustic transducers and other sensors for improving the operation of a device. The core sensors will in most cases be hardware sensors, but it could also be a virtual sensor that provide core functionality based mainly on software (e.g. virtual gyroscopes based on accelerometer data). In some cases, the sensor fusion aspect of a virtual sensor can be used to create a sensor which is either not available or even feasible as a hardware sensor due to design complexity, size, weight, or cost reasons.

Virtual sensors provide electronic devices with new options to simplify design, reduce cost and become less reliant on supply chains for hardware sensors etc. Since the virtual sensor is a software sensor, even software updates including over-the-air updates are possible options to enhance the performance of the virtual sensor after the user acquired the electronic device.

One drawback of virtual sensors based on sensor fusion are situations where at least one of the input sensors is either intermittently or permanently malfunctioning and producing incorrect sensor event output. This may result in erroneous behavior and possibly a malfunctioning virtual sensor. It is therefore an object of the present invention to provide a device and method suitable for handling failures or unexpected measurements in at least one sensor which is part of a virtual sensor. This is obtained as specified in the accompanying claims.

Thus the present invention is capable of detecting and compensating for erroneous behavior in the hardware sensors in the device in addition to being able to monitor the use of the device as well as possibly the device surroundings. Since the virtual sensor is a software sensor, detecting faulty sensor inputs to the sensor fusion part of the sensor can be done in software by verifying all the sensor input based on principles described above. It is prior art that different mechanisms based on machine learning and specific neural networks can be used to detect faulty sensors in for instance autonomous driving system, e.g. as described in Saeid Safavi et al: "Multi-sensor Fault Detection, Identification, Isolation and Health forecasting for Autonomous Vehicles", Sensors 2021, 21, 2547. https://doi.org/10.3390/s21072547, where the impact of a faulty sensor may be severe.

The virtual sensor could use software or hardware-based neural networks to identify faulty sensors to enhance its own robustness or other machine learning techniques.

Machine learning may be performed in several ways, for example based on storing and analyzing normal use, possibly with feedback from a user through suitable user interfaces. One example is discussed in Norwegian patent application No. 20210589. The machine learning may thus detect deviations from typical use for example based on correlation between different sensor inputs during use, and report deviations letting the user investigate or adjust the analysis letting the device know that the detected deviation is to be considered within expected normal use.

The present invention is based on electronic devices where the virtual sensor will be able to detect the use of a device based on the different hardware sensors, and provide a high-performing sensor that can be used to control for example the output and energy consumption of the device as well as information presented to the user, e.g. as described in Norwegian patent NO345,005 where the information displayed on a device depends on the use or NO345509 depending on the proximity of a user using ultrasound signals in a combination with inertia measuring units.

The invention will be described more in detail with reference to the accompanying drawings, illustrating the invention by way of examples.

Figure 1:
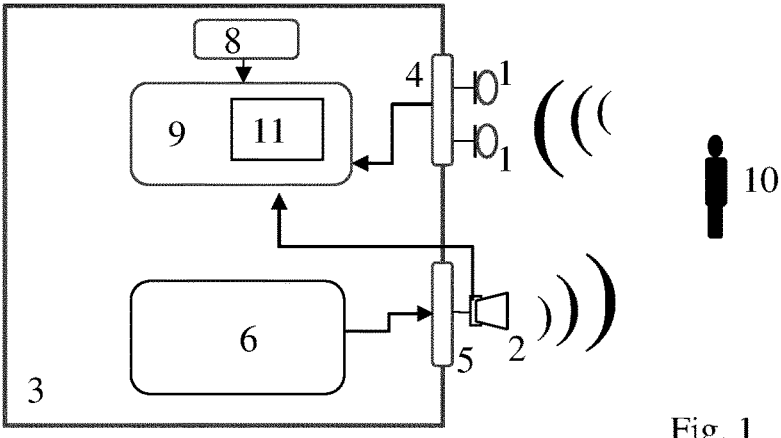
FIG. 1 illustrates an embodiment of the present invention incorporated in a mobile phone.

FIG. 1 illustrates an example of a device 3, such as a mobile phone, including the present invention, where the device includes a sound generator 6 connected through a speaker interface 5 to an acoustic output device such as a speaker 2, ultrasonic transducer, piezo-electric element, etc. The speaker 2 may be connected to a processing module 9. The processing module 9 is also connected to other sensors such as one or more microphones 1 or ultrasound transducer, through an acoustic interface 4 as well as additional sensors 8, such as inertia (IMU) sensor, camera, radar, UWB sensor, pressure, light, touch controller, etc. The processing module 9 also includes a virtual sensor unit 11 utilizing the signals from the different sensors to provide a virtual sensor.

The device may use the acoustic signals through speaker and microphones for communication purposes as a mobile phone but may also be configured as a virtual sensor detecting the presence of a user 10.

Figure 2:
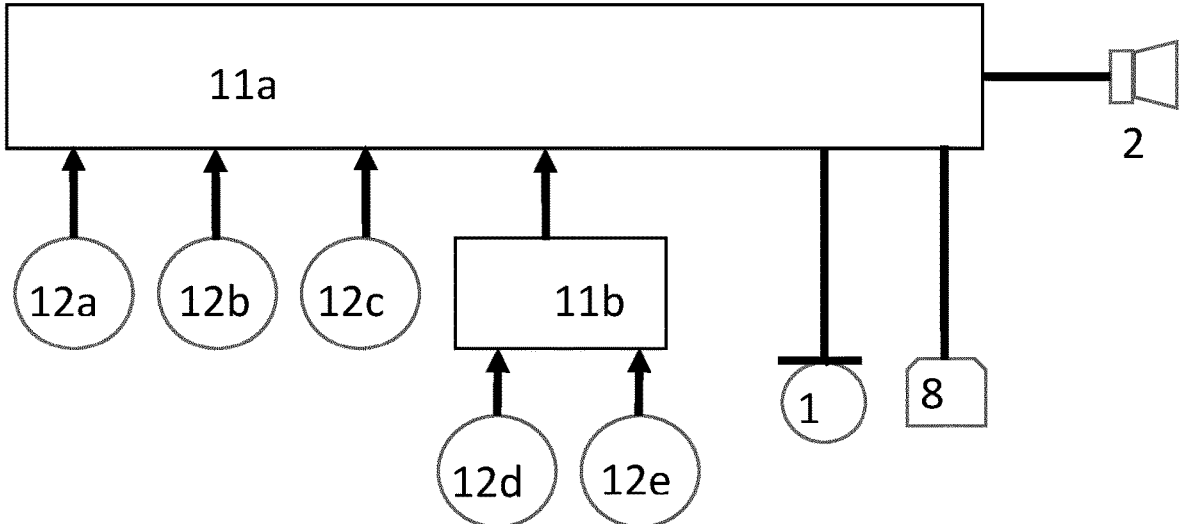
FIG. 2 illustrates a virtual sensor system including a number of sensors.

FIG. 2 illustrates the virtual sensor unit 11 illustrating a first virtual sensor 11a being connected to a number of hardware sensors 1,2,8,12a-12c. In addition, a secondary virtual sensor 11b is connected to additional hardware sensors 12d, 12e where the secondary virtual sensor may report to the primary virtual sensor as an independent sensor. As an example, this could use two ultrasound sensors where the secondary virtual sensor reports the direction of the received ultrasound.

As mentioned above, the virtual sensors 11a, 11b may be vulnerable to errors in the hardware sensors 12a-12e which may cause the device to fail. If the virtual sensor does not detect any of the malfunctioning sensor inputs, the sensor output from the virtual sensor may be incorrect unless the virtual sensor is designed to handle malfunctioning sensor inputs. If the virtual sensor output is critical and may cause physical harm, the robustness of the virtual sensor is critical too.

More in detail, the present invention may be provided with a normal model of the operation, either preprogrammed or stored during normal operations or in a learning sequence or period. The device may be configured with an interface making it possible to respond to the device, for example confirming that a registered deviation is within normal use or if it represents an error in the operation. The learning sequence or the preprogrammed data may include simulations where the transducers are turned off to register how the virtual sensor reacts to the errors and thus making it possible to recognize the reactions.

Figure 3:
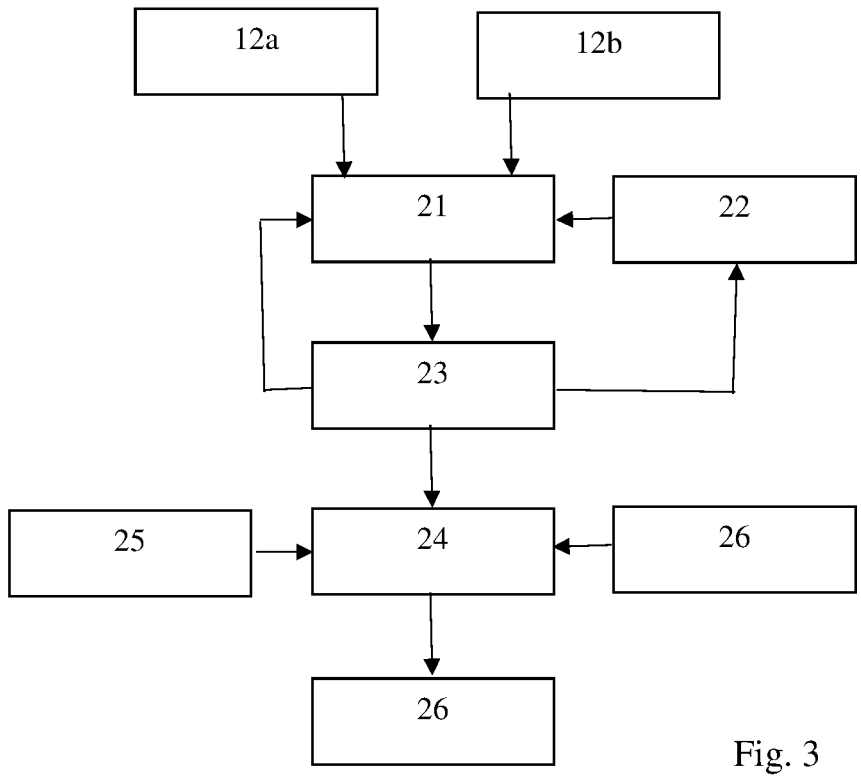
FIG. 3 illustrates a preferred embodiment of the process according to the invention.

FIG. 3 illustrates the method according to the invention evaluating the signals from the sensors 12*a*, 12*b* etc. The signals from the sensors 12*a*, 12*b* are transmitted to the processor for comparing 21 measurements with the predetermined model 22 representing the typical behavior of the sensors. As the sensors are sampling essentially simultaneously during use there will be correlations and patterns of corresponding measurements, for example where the inertia sensors will register the movements of a mobile phone toward the ear of a user while the proximity sensor registers that the ear will get closer to the phone.

The device will then be configured to register 23 if the measurements are according to the models. If the measurements are within normal behavior the system will go back to waiting for the next measurements 21, and the measurements may be fed back to the model 22 for updating and improving the model based on the new measurements.

If a deviation from the model 22 is registered 23 a failure or error may be indicated 24. In order to detect the type of error, such as clogged microphone, the deviation from the measurements may be compared with additional models 25,26 representing different types of errors so as to improve the diagnoses indicated to the user and/or manufacturer 26.

Based on the stored model the present invention may thus detect if for example an ultrasound transmitter is defect as the received signal will differ from the signals received under situations that according to the other transducers, such as acoustic receivers, IMU, light sensors etc, corresponds to the present situation. For example, during a proximity detection, if the transmitter is defect the acoustic receiver(s) will not detect any user presence, but if the IMU detects that the device is moved it is likely that the user is present and the transmitter and/or both receivers may be defect. In a similar way, if the device knows that a speaker has transmitted an acoustic signal but only one of two microphones receives a reflected signal the other microphone may be defect.

An acoustic Virtual Sensor can usually detect if the acoustic signal is not as expected when it comes to amplitude, pulse rate, frequency components, signal length, etc. It can be more difficult for other sensors such as IMU sensors, touch panel sensors, SAR sensors etc. Fortunately, some sensors will include internal error detection mechanisms to identify issues with the sensor operation and may report corresponding errors to virtual sensor (e.g. open failed, etc). The virtual sensor may still repeatedly try to open the sensor to check if the faulty behavior was intermittent or not. Other sensors may report specific error values that the virtual sensor can identify. (e.g. not-a-number values). If a sensor reports one or more values outside the specified value range (e.g. accelerometer, etc), the virtual sensor can detect that. If a sensor reports one or more values outside the expected value range (e.g. expected acoustic amplitude, expected acoustic probe signal, etc), the virtual sensor can detect that. If a sensor reports multiple values that are somehow correlated (e.g. accelerometer, gyroscope, etc) and at least one of them is faulty, the virtual sensor can potentially detect that. If two or more sensors provide partially overlapping information (e.g. accelerometer and gyroscope, accelerometer, gyroscope and acoustic signal) and at least one of the values in either sensor is inconsistent with the other values, the virtual sensor can detect that. If two or more sensors provide information that should be correlated, the virtual sensor can detect if situations where the information is not correlated.

If a faulty sensor is vital for the performance of the virtual sensor, the virtual sensor may report its own error to the system. The importance of one specific sensor will vary and, in some cases the virtual sensor will still provide useful sensor output to the system. If the performance using the remaining set of sensors is acceptable, the virtual sensor should disable the sensor to reduce power consumption. If the faulty sensor does not detect any issues with its own output data, the sensor data in question may be faulty and offset the virtual sensor output. Even if the offset in the virtual sensor output is not easily detectable by the user, the performance by the virtual sensor could still be degraded and in some cases reduce the overall performance of the virtual sensor and all the features relying on the virtual sensor.

ML training can be used to establish rules for what are acceptable sensor values for specific sensors. This information can be extracted from the ML model and serve as semi-reliable information about when the values from a particular sensor seems to be faulty. If there are at least two sensors (e.g. accelerometer and gyroscope) with conflicting information, the system should either discard both sensors or decide which of the sensors to trust. This can be done by the user through a calibration process made available by the device vendor. When that happens, the Virtual Sensor should either immediately switch to using another neural network based on the sensors that are seemingly work properly for its own detection processing or make sure that sensor input in question is modified to make sure the neural network is for all practical purposes ignoring the broken sensor. Ignoring the sensor can be done in the ML training process by artificially training the neural network with input data from at least one broken sensor.

The training of the machine learning or neural network may be performed by recognizing correlating measurements during normal operations, e.g. situations where a user has not indicated through an interface that a problem has occurred. By continuously sampling and evaluating the measurements, a model of a typical use pattern may be built. When new measurements are sampled, they may either be implemented in the model by the machine learning algorithm if they are within the range defined by the existing model, or may cause a failure indication if the new measurements deviate too much from the model. If an error has been detected the measurements may be compared to models based on different errors in order to detect the cause of the error, for example a sensor malfunction.

In some cases, a set of sensors are part of the same hardware package or used in a set of different virtual sensors. If one of them fails, there may be questions about the other sensors in this package.

The virtual sensor should automatically make regular attempts at using a sensor that is potentially broken. At some point, the virtual sensor might give up on the sensor and prevent it from being enabled to reduce power consumption. If so, the virtual sensor should switch to a separate neural network or insert an adjusted ML feature into the neural network to indicate lack of valid input.

Virtual Sensors based on acoustic data processing as described in the references cited above often make use of sensor fusion to improve overall performance. In these virtual sensors, there may even be problems with the audio components (e.g. speaker problem, damaged microphone, clogged microphone, etc) that may have an impact on the virtual sensor. The core use-case of the virtual sensor will normally dictate which sensors that will be used as input to the sensor fusion part of the virtual sensor. Although the sensor inputs in most cases will be time-series data with a frequency above 1 Hz, some of the sensors may be on-change sensors where the sensor can change between different states when applicable and where the sensor frequency does not really make sense. Some of the most popular sensors using sensor fusion as part of the acoustic virtual sensor are touch sensors, SAR sensors, ambient light sensors, hall sensors, hinge sensors, accelerometers gyroscopes, 6DoF sensors, 3DoF sensors, rotational sensors, translational sensors, etc.

As discussed earlier, an issue with sensor fusion in these acoustic sensors is that loss of one of the sensor inputs including the acoustic data due to at least one faulty sensor or acoustic receiver and/or acoustic transmitter may negatively impact the performance of the Virtual Sensor. This is especially true if the Virtual Sensor is actively using Machine Learning and neural networks where the sensor information is used as machine learning features either directly or after some pre-processing to extract key features of the inputs. A virtual sensor may use a processing chain with one or more neural networks and additional processing steps before and after each neural network. The neural network may be run in parallel or serially depending on the sensor inputs and the specific use-case.

Handling faulty sensor inputs properly requires the virtual sensor to include a mechanism to detect if any of the sensor inputs are faulty or suspicious. Detecting faulty sensors in a detection phase using either software processing to verify the sensor inputs as described earlier or more advanced schemes based on machine learning and neural networks is a viable option. Identifying faulty sensors by looking for contradicting combinations of sensor inputs using suitable machine learning networks is possible. One option is that the virtual sensor includes pre-processing based on a separate neural network or software processing to detect faulty sensor input before the sensor inputs in question are fed into the relevant set of neural networks used by of the virtual sensor.

Although it is possible to run a detection phase as a pre-processing step before the virtual sensor processing starts, it may not fit with the sensor framework in the platform. After all, it is a requirement that all the other inputs that are used by the virtual sensor are available to the detection process. For all practical purposes, it is less complicated to include the detection phase as part of the virtual sensor processing in a separate pre-processing step. Integrating similar functionality into the core part of the suite of neural networks used by the virtual sensor itself can be more complicated without providing any obvious benefit.

If an input is tagged as faulty, it must be handled accordingly in the virtual sensor. There are several options to handle faulty sensors. The faulty sensor input in question can be altered to provide neutral input values that neural networks can recognize and for all practical purposes treat as inconsequential for the sensor output decision. It might be possible to ignore the faulty sensor input if virtual sensor and potentially its neural networks are robust enough to provide correct sensor output even if one of the sensor inputs are faulty. Another option is to exclude the input from the set of neural networks. Changing to another set of neural networks where the sensor input in question is not used, is another option to handle faulty sensors. Separate sets of neural networks for different combinations of valid sensor inputs are a reliable way to solve this problem. Ideally, faulty sensor input can be handled during the training process of the neural network. It is possible to anticipate faulty sensor inputs and take that into account during the ML training process to make either a large model where any number of faulty sensors inputs can be handled by the neural network automatically or through a number of smaller models (i.e. one model for each faulty sensor or combination of faulty sensors) where the faulty sensors will be excluded from the neural network processing. It is also possible to inject faulty sensor data during ML training to allow the neural networks to take faulty sensors into account. Since using faulty sensor data in ML training and subsequent neural networks can be hard to predict, using a set of smaller models where the faulty sensors are not included in the neural network processing is another viable choice for the Virtual Sensor.

It is simple to simulate faulty sensors during ML training by merely keeping the sensor data of the sensor in question out of the training process. The number of different models that needs to be created to handle all possible sensor issues depends on the number of sensor inputs used in the sensor fusion parts of the Virtual Sensor.

If a virtual sensor detects that at least one of its core sensors are faulty but it can still function above a set of well-defined requirements, it should still report an error preferably indicating the sensors that is faulty. If the virtual sensor cannot provide any usable sensor output if the sensor in question is faulty, it should by itself report an error to the system when someone tries to open it. This report should also indicate which sensor or sensors that are faulty. Based on the error reporting, the system may initiate either a replacement process for the component or electronic device or well-documented instructions for a repair process that may be done by the user or the device supplier or vendor. As an example, clogged microphone holes can in some cases be cleaned using special tools or suction devices (e.g. hoover).

To summarize, the present invention relates to an electronic device and corresponding method, where the electronic device includes at least two sensors. The at least two sensors are in communication with, e.g. through wireless or electronic connection or as software modules, a virtual sensor including a processing unit adapted to monitor the use of the device based on input from said sensors.

The at least two sensors include activity sensors sensing user activities related to the device, such as proximity sensors and/or inertia (IMU) sensors, and the processing unit is configured to receive and analyze the input from sensors during use, and to provide and store a model representing said typical use of the device. The device further is configured to compare new measurements received from said sensors with the model, this way providing a signal if the new measurements from said sensors deviates by a predetermined limit from the measurements predicted by the model. The model may be based on statistical information from previous use, factory set values and/or be redefined based on user interaction and activities.

The model may include the typical situation where at least one of said sensors is malfunctioning, and the processor of the device is configured to recognize the situation and ignore the signals from the malfunctioning sensor.

The two sensors may include a proximity sensor detecting if a user is close to the device. Typically, this will include at least one acoustic transmitter and at least one acoustic receiver configured to detect the presence of a user including user activity such as gestures, close to the device, preferably defined within a threshold distance value, where the processing unit configured to detect a malfunction in at least one of said transducer and receiver if at least part of the measurements deviates too much form the model.

Other types of sensors may be contemplated, such as inertia (IMU) sensor, camera, radar, UWB sensor, pressure, light, touch controller, etc.

The device will preferably include a user interface configured to communicate a detected malfunction to the user and/or to allow the user to indicate if the signals from the virtual sensor are within ordinary use or device performance. The processing unit may then be configured to update the model based on the indication from the user.

The model is generated based on a machine learning algorithm detecting correlations between previous measurements from said sensors, and dynamically updated it with new measurements when said measurements are within limits determined by said model. The limits may possibly be the same as the limits defining the deviation or be set separately. A failure may then be reported if new measurements from at least one of the sensors are outside said determined limits.

The present invention also relates to a method for evaluating the performance of an electronic device, where the device includes at least two sensors providing measurements at a predetermined rate. The at least two sensors detect the user presence, including activity such as gestures, in relation to the device, such as a proximity sensor and an inertia measuring sensor and are connected to or communicating with a virtual sensor including a processing unit adapted to monitor the use of the device based on input from said sensors. The method includes the steps of receiving the measurements from said sensors, comparing the measurements with a predetermined model representing the typical use of the device, and providing a signal if the new measurements from said sensors deviates by a predetermined limit from the measurements predicted by the model.

The method may also include the step of, if the measurements of one sensor deviates from the measurements predicted by the model in a corresponding situation, the processor ignores the signals from the malfunctioning sensor.

The method may also include the step of, if the measurements deviate from the predicted measurements, comparing the measurements with a set of predetermined models each indicating selected sensor failures.

The model may be generated based on a machine learning algorithm detecting correlations between previous measurements from said sensors and be dynamically updated with new measurements when said measurements are within limits determined by said model. A failure may be reported if new measurements from at least one of the sensors are outside said determined limits and a user or further analysis may consider if the new measurement should be defined as being within the model of the normal use of the device.

The invention claimed is:

1. An electronic device comprising:

a virtual sensor being in communication with at least two sensors;

a processing unit adapted to monitor use of the electronic device based on input from the at least two sensors;

wherein the at least two sensors comprise activity sensors sensing user activities related to the electronic device;

wherein the processing unit is configured to receive and analyze the input from the at least two sensors during use and to provide and store a model predicting measurements representing typical use of the electronic device;

wherein the processing unit is configured to compare new measurements received from the at least two sensors with the model, providing a signal if the new measurements from the at least two sensors deviates by a predetermined limit from measurements predicted by the model;

wherein the model comprises a situation where at least one of the at least two sensors is malfunctioning, and the electronic device is configured to ignore signals from the at least one malfunctioning sensor, wherein the at least two sensors comprise an acoustic proximity sensor detecting if a user is close to the electronic device; and wherein the at least two sensors also comprises at least one of the following sensors: inertia (IMU) sensor, camera, and/or radar, UWB-, pressure, light, touch controller sensors.

2. The electronic device according to claim 1, wherein the model comprises a set of predetermined additional models each indicating selected sensor failures so as to improve diagnosis.

3. The electronic device according to claim 1, wherein, at a failure detected by the processing unit selecting a model from a set of models where the at least one malfunctioning sensor is not comprised.

4. The electronic device according to claim 1, wherein the proximity sensor comprises at least one acoustic transmitter and at least one acoustic receiver configured to detect presence of a user close to the electronic device, the processing unit being configured to detect a malfunction in at least one of the at least one acoustic transmitter and the at least one receiver.

5. The electronic device according to claim 1, wherein the electronic device comprises a user interface, wherein the user interface is configured to communicate a detected malfunction to the user or to indicate if the signals from the virtual sensor is within ordinary use or device performance, and the processing unit being configured to update the model based on the indication from the user.

6. The electronic device according to claim 1, wherein the model is generated based on a machine learning algorithm detecting correlations between previous measurements from the at least two sensors, and wherein the model is dynamically updated with new measurements when the measurements are within limits determined by the model.

7. The electronic device according to claim 6, wherein a failure is reported if new measurements from at least one of the at least two sensors are outside the determined limits.

8. A method for evaluating performance of an electronic device, the electronic device comprising at least two sensors providing measurements at a predetermined rate, the at least two sensors detecting user presence in relation to the electronic device, the at least two sensors comprising an acoustic proximity sensor and an inertia measuring sensor, the at least two sensors being connected to a virtual sensor comprising a processing unit adapted to monitor use of the electronic device based on input from the at least two sensors, the method comprising:

receiving the measurements from the at least two sensors;

comparing the measurements with a predetermined model representing a typical use of the electronic device; and providing a signal if new measurements from the at least two sensors deviates by a predetermined limit from the measurements predicted by the model; and if the measurements of one sensor deviates from the measurements predicted by the model in a corresponding situation, ignoring the signals from the deviating sensor.

9. The method according to claim 8, comprising, if the measurements deviate from predicted measurements, comparing the measurements with a set of additional predetermined models each indicating selected sensor failures.

10. The method according to claim 8, wherein the electronic device comprises a user interface configured to receive indications of a failure from the user, the method comprising a step of updating the model at receipt of a failure report.

11. The method according to claim 8, wherein the model is generated based on a machine learning algorithm detecting correlations between previous measurements from the at least two sensors, and wherein the model is dynamically updated with new measurements when the measurements are within limits determined by the model.

12. The method according to claim 11, wherein a failure is reported if new measurements from at least one of the at least two sensors are outside the determined limits.

\* \* \* \* \*